(12) United States Patent
Yuan et al.

(10) Patent No.: US 10,428,246 B2
(45) Date of Patent: Oct. 1, 2019

(54) ADHESIVE COMPOSITION

(71) Applicant: INDUSTRIAL TECHNOLOGY RESEARCH INSTITUTE, Hsinchu (TW)

(72) Inventors: Yi-Hsin Yuan, New Taipei (TW); Wen-Bing Chu, Hsinchu (TW); Chang-Hsing Lu, Hsinchu (TW); Dar-Jen Liu, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 62 days.

(21) Appl. No.: 15/903,877

(22) Filed: Feb. 23, 2018

(65) Prior Publication Data

US 2019/0185723 A1 Jun. 20, 2019

(30) Foreign Application Priority Data

Dec. 19, 2017 (TW) .............................. 106144575 A

(51) Int. Cl.
*C09J 127/16* (2006.01)
*C08L 29/14* (2006.01)
*C08K 3/04* (2006.01)

(52) U.S. Cl.
CPC ............. *C09J 127/16* (2013.01); *C08K 3/041* (2017.05); *C08K 3/042* (2017.05); *C08K 3/046* (2017.05); *C08K 2201/001* (2013.01); *C08K 2201/005* (2013.01); *C08L 29/14* (2013.01)

(58) Field of Classification Search
CPC ............... C09J 129/14; C09J 2201/602; C08L 2205/025; C08L 27/16
See application file for complete search history.

(56) References Cited

U.S. PATENT DOCUMENTS

| | | | |
|---|---|---|---|
| 9,017,853 B2 | 4/2015 | Wu et al. | |
| 9,123,940 B2 | 9/2015 | Sannan et al. | |
| 9,673,480 B2 | 6/2017 | Medlege et al. | |
| 2010/0092871 A1 | 4/2010 | Medlege et al. | |
| 2011/0034618 A1* | 2/2011 | Register | C09D 5/20 524/512 |
| 2014/0162118 A1 | 6/2014 | Chu et al. | |
| 2014/0178753 A1 | 6/2014 | Chu et al. | |
| 2015/0140423 A1 | 5/2015 | Brown et al. | |

FOREIGN PATENT DOCUMENTS

| | | |
|---|---|---|
| CN | 101265379 A | 9/2008 |
| CN | 101265397 A | 9/2008 |
| CN | 102046742 C | 5/2011 |
| CN | 103429628 A | 12/2013 |
| CN | 105122501 A | 12/2015 |
| CN | 105322132 A | 2/2016 |
| CN | 106450333 A | 2/2017 |
| CN | 106653383 A | 5/2017 |
| CN | 105551830 B | 6/2017 |
| CN | 106898777 A | 6/2017 |
| EP | 2 284 235 A1 | 2/2011 |
| EP | 2 683 008 A1 | 1/2014 |
| FR | 3 007 206 B1 | 12/2014 |
| JP | 2004079327 A * | 3/2004 |
| KR | 10-2005-0022577 A | 3/2005 |
| KR | 10-2016-0115327 A | 10/2016 |
| TW | 529200 B | 4/2003 |
| TW | I469867 B | 1/2015 |
| TW | 201512095 A | 4/2015 |
| TW | I480166 B | 4/2015 |
| TW | I598207 B | 9/2017 |
| TW | 201739810 A | 11/2017 |
| WO | WO 2009/147989 A1 | 12/2009 |
| WO | WO 2011/029058 A2 | 3/2011 |
| WO | WO 2015/009867 A1 | 1/2015 |
| WO | WO-2017165127 A1 * | 9/2017 ............... C09D 7/61 |

OTHER PUBLICATIONS

Taiwanese Office Action and Search Report for Taiwanese Application No. 106144575, dated Jul. 9, 2018.

* cited by examiner

*Primary Examiner* — Mark S Kaucher
(74) *Attorney, Agent, or Firm* — Birch, Stewart, Kolasch & Birch, LLP

(57) ABSTRACT

An adhesive composition is provided. The adhesive composition includes 3~10 parts by weight of polyvinylidene fluoride (PVDF), wherein the polyvinylidene fluoride includes two polyvinylidene fluorides with different weight average molecular weights ranging from 20000 to 3000000, and at least one of the polyvinylidene fluorides has a carboxyl group; 0.1-0.5 parts by weight of polyvinyl butyral (PVB); and 0.1-3 parts by weight of a conductive powder.

10 Claims, No Drawings

ADHESIVE COMPOSITION

CROSS REFERENCE TO RELATED APPLICATIONS

The present application is based on, and claims priority from, Taiwan Application Number 106144575, filed on Dec. 19, 2017, the disclosure of which is hereby incorporated by reference herein in its entirety.

TECHNICAL FIELD

The disclosure relates to an adhesive composition.

BACKGROUND

Although aqueous polymers have been used as an adhesive agent in conductive carbon films, the resulting conductive carbon films have poor electrical conductivity (for example, less than 0.09 $Scm^{-1}$). Therefore, oily polymers such as polyvinylidene fluoride (PVDF) are more commonly used.

However, although the electrical conductivity of conductive carbon film is improved by using polyvinylidene fluoride (PVDF) as an adhesive agent when forming conductive carbon film, the adhesion between the conductive carbon film and the substrate is greatly reduced (for example, less than 100 gf/15 mm). As a result, the conductive carbon film may easily delaminate from the surface of the substrate.

Therefore, an adhesive composition capable of forming a thin film which has electrical conductivity and high adhesion to the substrate is needed.

SUMMARY

An embodiment of the present disclosure provides an adhesive composition, including 3-10 parts by weight of polyvinylidene fluoride (PVDF), wherein the polyvinylidene fluoride includes two polyvinylidene fluorides with different weight average molecular weights ranging from 20000 to 3000000, and at least one of the polyvinylidene fluorides has a carboxyl group; 0.1-0.5 parts by weight of polyvinyl butyral (PVB); and 0.1-3 parts by weight of a conductive powder.

A detailed description is given in the following embodiments with reference to the accompanying drawings.

DETAILED DESCRIPTION

The following disclosure provides many different embodiments, or examples, for implementing different features of the provided subject matter. For example, reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The embodiments of the present disclosure provide an adhesive composition. The thin film formed from the adhesive composition not only has electrical conductivity but also has high adhesion to the substrate. Therefore, the adhesive composition provided by the present disclosure and the thin film formed therefrom solve the problems of poor electrical conductivity or easy delamination of the conductive carbon film from the substrate in the prior art.

An embodiment of the present disclosure provides an adhesive composition, including 3-10 parts by weight of polyvinylidene fluoride (PVDF), wherein the polyvinylidene fluoride includes two polyvinylidene fluorides with different weight average molecular weights ranging from 20000 to 3000000, and at least one of the polyvinylidene fluorides has a carboxyl group; 0.1-0.5 parts by weight of polyvinyl butyral (PVB); and 0.1-3 parts by weight of a conductive powder.

In some embodiments, the adhesive composition may include 3-10 parts by weight of polyvinylidene fluoride (PVDF). For example, in one embodiment, PVDF may be 3-5 parts by weight. When the amount of PVDF is too high, the conductive properties of the adhesive composition decrease. When the amount of PVDF is too low, the adhesion between the thin film formed from the adhesive composition and the substrate cannot be improved.

In some embodiments, PVDF may include two PVDFs with different weight average molecular weights ranging from 20000 to 3000000, and at least one of the PVDFs has a carboxyl group. In some embodiments, the two PVDFs with different weight average molecular weights may include one PVDF with a greater weight average molecular weight and another PVDF with a lower weight average molecular weight. For example, in some embodiments, the two PVDFs with different weight average molecular weights may include a PVDF with a weight average molecular weight of 20000-100000 and a PVDF with a weight average molecular weight of 100000-3000000. In some embodiments, the two PVDFs with different weight average molecular weights may include a PVDF with a weight average molecular weight of 20000-80000 and a PVDF with a weight average molecular weight of 100000-1000000. In some embodiments, PVDF may be a homopolymer or a modified copolymer.

In some embodiments, the weight ratio between the two PVDFs with different weight average molecular weights may be 1:4-4:1. For example, in some embodiments, the weight ratio between the PVDF with a greater weight average molecular weight and the PVDF with a lower weight average molecular weight may be, for example, 1:3, 1:1, or 3:1.

It should be noted that at least one PVDF of the two PVDFs with different weight average molecular weights has a carboxyl group. In some embodiments, the weight of the PVDF having a carboxyl group accounts for 10%-100% of the weight of the total PVDFs. For example, in some embodiments, the weight of the PVDF having a carboxyl group may account for 10%, 25%, 50%, or 100% of the weight of the total PVDFs.

In addition, the carboxyl group is not limited to modify on the PVDF with a specific weight average molecular weight. In some embodiments, the carboxyl group may be modified on the PVDF with a greater weight average molecular weight. In some embodiments, the carboxyl group may be modified on the PVDF with a lower weight average molecular weight. However, when the carboxyl group is modified on the PVDF with a lower weight average molecular weight, the improvement to the adhesion is more obvious.

It is worth mentioning that although the PVDF with a greater weight average molecular weight (macromolecule) can be effectively coated on the conductive powder, it has poor adhesion to the substrate. Although the PVDF with a lower weight average molecular weight (small molecule)

has better adhesion to the substrate, it tends to cause separation between the conductive powders, making it difficult to form an intact thin film. In the present disclosure, two PVDFs with different weight average molecular weights are adjusted to an adequate ratio, thereby the interaction between PVDF and the conductive powder is increased due to the macromolecule PVDF and the adhesion between PVDF and the substrate is improved due to the small molecule PVDF. Moreover, the carboxyl group modified on any kind of the PVDF further promotes the adhesion between PVDF and the substrate.

In some embodiments, the adhesive composition may include 0.1-0.5 parts by weight of polyvinyl butyral (PVB). For example, in one embodiment, PVB may be 0.2-0.5 parts by weight. When the amount of PVB is too high, the resistance of the adhesive composition increases, and the conductive properties of the adhesive composition decrease. When the amount of PVB is too low, the adhesion between PVDF and the substrate cannot be improved.

In some embodiments, PVB has the following formula:

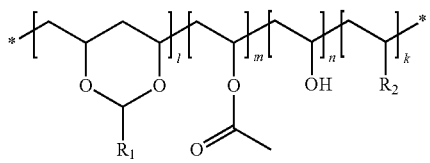

In the above formula, l is a positive integer ranging from 48 to 56, m is 3 or 4, n is a positive integer ranging from 40 to 50, k is 3 or 4; $R_1$ is a C1-C3 linear alkyl group; $R_2$ includes a hydroxyl group, a carboxyl group, an ester group, an amide group, an anhydride group, or a combination thereof. In one embodiment, l is 48, m is 3, n is 40, k is 4, $R_1$ is a $C_3H_7$ linear alkyl group, and $R_2$ is a hydroxyl group. In the embodiments of the present disclosure, PVB may be functioned as an adhesion promoter to improve the adhesion between PVDF and the substrate.

In some embodiments, PVB may have a weight average molecular weight of, for example, 10000-200000. In other embodiments, PVB may have a weight average molecular weight of, for example, 14000-130000.

In some embodiments, the adhesive composition may include 0.1-3 parts by weight of a conductive powder. For example, in one embodiment, the conductive powder may be 2-3 parts by weight. When the amount of the conductive powder is too high, the adhesion between the thin film formed from the adhesive composition and the substrate is poor. When the amount of the conductive powder is too low, the conductive properties of the adhesive composition decrease.

In some embodiments, the conductive powder may include carbon black, graphite, graphene, carbon fiber, carbon nanotubes, nano-metal particles, or a combination thereof. In some embodiments, the conductive powder may have a particle size of 10 nm-800 nm. For example, in some embodiments, the conductive powder may have a particle size of 34 nm-300 nm. It should be noted that the shape and the particle size of the conductive powder are not particularly limited. As long as the material possesses conductive properties, it is suitable to be used in the embodiments of the present disclosure.

In some embodiments, the adhesive composition may further include a solvent, for example, 136-143 parts by weight of a solvent. In some embodiments, the solvent may be an organic solvent. For example, N-methylpyrrolidinone (NMP), dimethylacetamide (DMAc), or a combination thereof. In some embodiments, the solvent may be used to formulate the adhesive composition to a coating material having a suitable solid content so as to be coated on a substrate. Therefore, after the drying process, the solvent is volatilized and does not exist in the resulting thin film.

Another embodiment of the present disclosure provides a thin film. The thin film is formed by coating and drying the aforementioned adhesive composition. In some embodiments, the adhesive composition may be coated on the substrate. In some embodiments, the substrate may be a metal substrate. For example, the substrate may be made of aluminum, copper, stainless steel, nickel, and so on. In some embodiments, methods for coating the adhesive composition may include, for example, spray coating, roll coating, dip coating, bar coating, spin coating, knife coating, brush coating, or a combination thereof. In some embodiments, the drying process may be performed at a temperature of 100-200° C. for 5-30 minutes. For example, in one embodiment, the temperature of the drying process may be 110° C., and the time of the drying process may be 30 minutes. In this step, the thin film, which has electrical conductivity and a high adhesion to the substrate, provided by the present disclosure is accomplished.

The thin film provided by the present disclosure can be adjusted to have an appropriate thickness according to the actual needs. In some embodiments, the thin film formed from the aforementioned adhesive composition may have a thickness of, for example, 1 μm-20 μm. In some embodiments, for example, the thin film may have a thickness of 1 μm. In some embodiments, the thin film may have an electrical conductivity of, for example, greater than 0.4 ($Scm^{-1}$). In some embodiments, the thin film may have an adhesion of, for example, greater than 600 (gf/15 mm). In other embodiments, the thin film may have an adhesion of, for example, greater than 800 (gf/15 mm).

Compared to conventional conductive carbon films having poor electrical conductivity or that delaminate from the substrate too easily, since the adhesive composition provided by the present disclosure includes adequate ratio of macro molecule PVDF, small molecule PVDF, and PVB, and at least one of the PVDFs has a carboxyl group, when the thickness of the thin film formed from the adhesive composition reaches 1 μm, not only does the thin film per se have electrical conductivity, but excellent adhesion is also provided between the thin film and the substrate.

The Examples and Comparative Examples are described below to illustrate the adhesive composition and the thin film formed therefrom provided by the present disclosure and the properties thereof.

[Examples 1-7][Comparative Examples 1-10]

Preparation of Adhesive Compositions—Test of Using Different Proportions of Ingredients PVDF* having a carboxyl group (MW 28000), PVDF* having a carboxyl group (MW 1000000), PVDF without a carboxyl group (MW 35000), PVDF without a carboxyl group (MW 1000000), PVB (MW 100000; bought from Sekisui Chemical), and the conductive carbon powder (Super P; bought from Timcal) were added to the solvent N-methylpyrrolidone (NMP) in accordance with the weight ratio shown in Table 1. The mixture was sufficiently stirred at room temperature (about 25° C.) to form an adhesive composition having a solid content of 5%.

Preparation of Thin Films

The adhesive compositions obtained in Examples 1-7 and Comparative Example 1-10 were coated on the aluminum foil substrate having a thickness of 20 μm by using bar coating. Next, a drying process was performed at 110° C. for 30 minutes to obtain a thin film having a thickness of about 1 μm Then, the adhesion between the thin film and the substrate and the electrical conductivity of the thin film itself were tested. A 180-degree peeling test was conducted using a tensile tester to test the adhesion between the resulting thin film and the substrate. The results are shown in Table 1. Through plane resistance measurement was conducted to test the electrical conductivity of the resulting thin film, and the results are shown in Table 1.

According to the results shown in Table 1, it can be seen that, compared to Comparative Examples 1-10 most of the thin films formed from the adhesive compositions of Examples 1-7 showed improvements in electrical conductivity and all of the adhesion between the thin films and the substrates were also improved. In particular, the electrical conductivities of the thin films formed from the adhesive compositions of Examples 1-4 and 7 were greater than 0.4 ($Scm^{-1}$), indicating that the electrical conductivity thereof was also improved. Furthermore, the adhesion between the thin films formed from the adhesive compositions of Examples 1-4 and the substrate are all greater than 800 (gf/15 mm), indicating that the thin films have better adhesion to the substrate.

In contrast, because the adhesive compositions of Comparative Examples 1-4 only include one PVDF with a single weight average molecular weight and do not include PVB, the resulting thin films have poor adhesion regardless whether the PVDF used has a carboxyl group or not.

The adhesive composition of Comparative Example 5 includes two PVDFs with different weight average molecular weights; however, none of the PVDFs used has a carboxyl group, and the adhesive composition does not include PVB. According to the results shown in Table 1, it can be seen that the adhesion and the electrical conductivity of the resulting thin film are poor.

The adhesive compositions of Comparative Examples 6 and 7 include PVB; however, the PVDF used only includes one PVDF* with a single weight average molecular weight which also has a carboxyl group. Thus, the adhesion and electrical conductivity of the resulting thin films are not satisfactory.

The adhesive compositions of Comparative Examples 8-10 include not only two PVDFs with different weight average molecular weights, but also one of the PVDFs used has a carboxyl group, and the adhesive composition also includes PVB. However, in Comparative Examples 8-10, the content of PVDF is not within the range required by the present disclosure. According to the results shown in Table 1, it can be seen that the adhesion and electrical conductivity of the resulting thin films are not satisfactory.

The adhesive composition of Example 5 includes two PVDFs with different weight average molecular weights, and all of the PVDFs used have a carboxyl group, and the adhesive composition also includes PVB. In Example 5, the weight of PVDF* having a carboxyl group accounts for 100% of the weight of total PVDFs. According to the results of Table 1, it can be seen that the resulting thin films have good adhesion.

The adhesive composition of Example 6 not only includes two PVDFs with different weight average molecular weights, but also one of the PVDFs used has a carboxyl group, and the adhesive composition also includes PVB. In Example 6, the weight of PVDF* having a carboxyl group accounts for 10% of the weight of total PVDFs. According to the results shown in Table 1, it can be seen that the resulting thin films have good adhesion.

In the adhesive composition of Example 7, the weight average molecular weight of PVDF* having a carboxyl group is 1000000, and the weight average molecular weight of PVDF without a carboxyl group is 35000. The weight ratio of PVDF* to PVDF is 1:3. According to the results shown in Table 1, it can be seen that the thin films formed from the adhesive compositions of Examples 1, 2, and 4 have improved adhesion as compared to the thin films formed from the adhesive composition of Example 7. The difference is that, in Examples 1, 2 and 4, the PVDF* having a carboxyl group is the one having a lower weight average molecular weight in the two PVDFs. However, in Example 7, the PVDF* having a carboxyl group is the one having a greater weight average molecular weight in the two PVDFs. According to the results, it can be seen that when the carboxyl group is modified on the PVDF with a lower weight average molecular weight, the improvement of the adhesion is more remarkable.

Examples 8-12

Preparation of Adhesive Compositions—Test of Using Different Conductive Powders and Substrates PVDF* having a carboxyl group (MW 28000), PVDF without a carboxyl group (MW 1000000), PVB (MW 100000; bought from Sekisui Chemical), and conductive carbon powder (as shown in Table 2) were added to the solvent N-methylpyrrolidone (NMP) in a weight ratio of 2:2:0.2:3, and the mixture was sufficiently stirred at room temperature (about 25° C.) to form an adhesive composition having a solid content of 5%.

Preparation of Thin Films

According to Table 2, the adhesive compositions obtained in Examples 8-12 were coated on the aluminum foil or copper foil substrate having a thickness of 20 μm by using bar coating. Next, a drying process was performed at 110° C. for 30 minutes to obtain a thin film having a thickness of about 1 μm.

Next, the adhesion between the thin film and the substrate was tested as described above, and the results are shown in Table 2.

According to the results shown in Table 2, it can be seen that the adhesion between the thin films formed from the adhesive compositions of Examples 8-12 and the substrate are greater than 600 (gf/15 mm), indicating that the resulting thin films have good adhesion to the substrate.

It will be apparent to those skilled in the art that various modifications and variations can be made to the disclosed embodiments. It is intended that the specification and examples be considered as exemplary only, with the true scope of the disclosure being indicated by the following claims and their equivalents.

TABLE 1

| | Adhesive composition (parts by weight) | | | | | | | Thin film | |
|---|---|---|---|---|---|---|---|---|---|
| | Polyvinylidene fluoride (PVDF) | | | | Polyvinyl butyral (PVB) l:m:n:k = 48:3:40:4 | Conductive carbon powder Super P | Solvent NMP | Adhesion (gf/15 mm) | Electrical conductivity (Scm$^{-1}$) |
| | PVDF* (MW28000) | PVDF* (MW1000000) | PVDF (MW35000) | PVDF (MW1000000) | | | | | |
| Example 1 | 1 | — | — | 3 | 0.5 | 3 | 142.5 | 904 | 0.523 |
| Example 2 | 3 | — | — | 1 | 0.3 | 3 | 138.7 | 869 | 0.404 |
| Example 3 | — | 2 | 2 | — | 0.2 | 3 | 136.8 | 823 | 0.788 |
| Example 4 | 2 | — | — | 2 | 0.2 | 3 | 136.8 | 861 | 0.486 |
| Example 5 | 2 | 2 | — | — | 0.5 | 3 | 142.5 | 491 | 0.284 |
| Example 6 | 0.4 | — | — | 3.6 | 0.5 | 3 | 142.5 | 694 | 0.248 |
| Example 7 | — | 1 | 3 | — | 0.5 | 3 | 142.5 | 487 | 0.499 |
| Comparative Example 1 | 4 | — | — | — | — | 3 | 133 | 373 | 0.384 |
| Comparative Example 2 | — | 4 | — | — | — | 3 | 133 | 401 | 0.161 |
| Comparative Example 3 | — | — | 4 | — | — | 3 | 133 | 26 | 0.275 |
| Comparative Example 4 | — | — | — | 4 | — | 3 | 133 | 6 | 0.594 |
| Comparative Example 5 | — | — | 2 | 2 | — | 3 | 133 | 80 | 0.148 |
| Comparative Example 6 | 4 | — | — | — | 0.4 | 3 | 140.6 | 440 | 0.370 |
| Comparative Example 7 | 4 | — | — | — | 0.5 | 3 | 142.5 | 465 | 0.260 |
| Comparative Example 8 | 1 | — | — | 1 | 0.5 | 2 | 85.5 | 386 | 0.295 |
| Comparative Example 9 | 1 | — | — | 1 | 0.5 | 3 | 104.5 | 381 | 0.304 |
| Comparative Example 10 | 1 | — | — | 1 | 0.5 | 4 | 123.5 | 320 | 0.312 |

TABLE 2

| | Conductive powder | Substrate | Adhesion (gf/15 mm) |
|---|---|---|---|
| Example 8 | Ketchen black (ECP600) | aluminum foil | 678 |
| Example 9 | Carbon fiber (VGCF) | aluminum foil | 869 |
| Example 10 | Granular conductive carbon black (Ensaco 350G) | aluminum foil | 725 |
| Example 11 | Granular conductive carbon black (Ensaco 250G) | aluminum foil | 775 |
| Example 12 | Powdered conductive carbon black (Super P) | copper foil | 786 |

What is claimed is:

1. An adhesive composition, comprising:
   3-10 parts by weight of polyvinylidene fluoride (PVDF), wherein the polyvinylidene fluoride comprises two polyvinylidene fluorides with different weight average molecular weights ranging from 20000 to 3000000, and at least one of the polyvinylidene fluorides has a carboxyl group;
   0.1-0.5 parts by weight of polyvinyl butyral (PVB); and
   0.1-3 parts by weight of a conductive powder.

2. The adhesive composition as claimed in claim 1, wherein the two polyvinylidene fluorides with different weight average molecular weights comprise a polyvinylidene fluoride with a weight average molecular weight of 20000-100000 and a polyvinylidene fluoride with a weight average molecular weight of 100000-3000000.

3. The adhesive composition as claimed in claim 1, wherein the weight ratio between the two polyvinylidene fluorides with different weight average molecular weights is 1:4-4:1.

4. The adhesive composition as claimed in claim 1, wherein the weight of the polyvinylidene fluoride having a carboxyl group accounts for 10%-100% of the weight of the total polyvinylidene fluorides.

5. The adhesive composition as claimed in claim 1, wherein the polyvinyl butyral has a formula of:

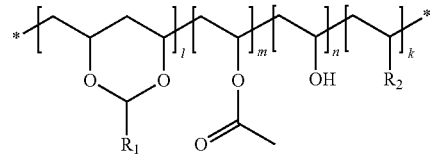

wherein l is a positive integer ranging from 48 to 56, m is 3 or 4, n is a positive integer ranging from 40 to 50, k is 3 or 4; $R_1$ is a C1-C3 linear alkyl group; $R_2$ comprises a hydroxyl group, a carboxyl group, an ester group, an amide group, an anhydride group, or a combination thereof.

6. The adhesive composition as claimed in claim 1, wherein the polyvinyl butyral has a weight average molecular weight of 10000-200000.

7. The adhesive composition as claimed in claim 1, wherein the conductive powder comprises carbon black, graphite, graphene, carbon fiber, carbon nanotubes, nanometal particles, or a combination thereof.

8. The adhesive composition as claimed in claim 1, wherein the conductive powder has a particle size of 10 nm-800 nm.

9. The adhesive composition as claimed in claim 1, further comprising a solvent comprising N-methylpyrrolidinone (NMP), dimethylacetamide (DMAc), or a combination thereof.

10. The adhesive composition as claimed in claim 9, wherein the adhesive composition is used to form a thin film, wherein the thin film has a thickness of 1 μm-20 μm.

* * * * *